March 24, 1942. M. PHILLIPS 2,277,350
FISHING LURE
Filed May 15, 1940
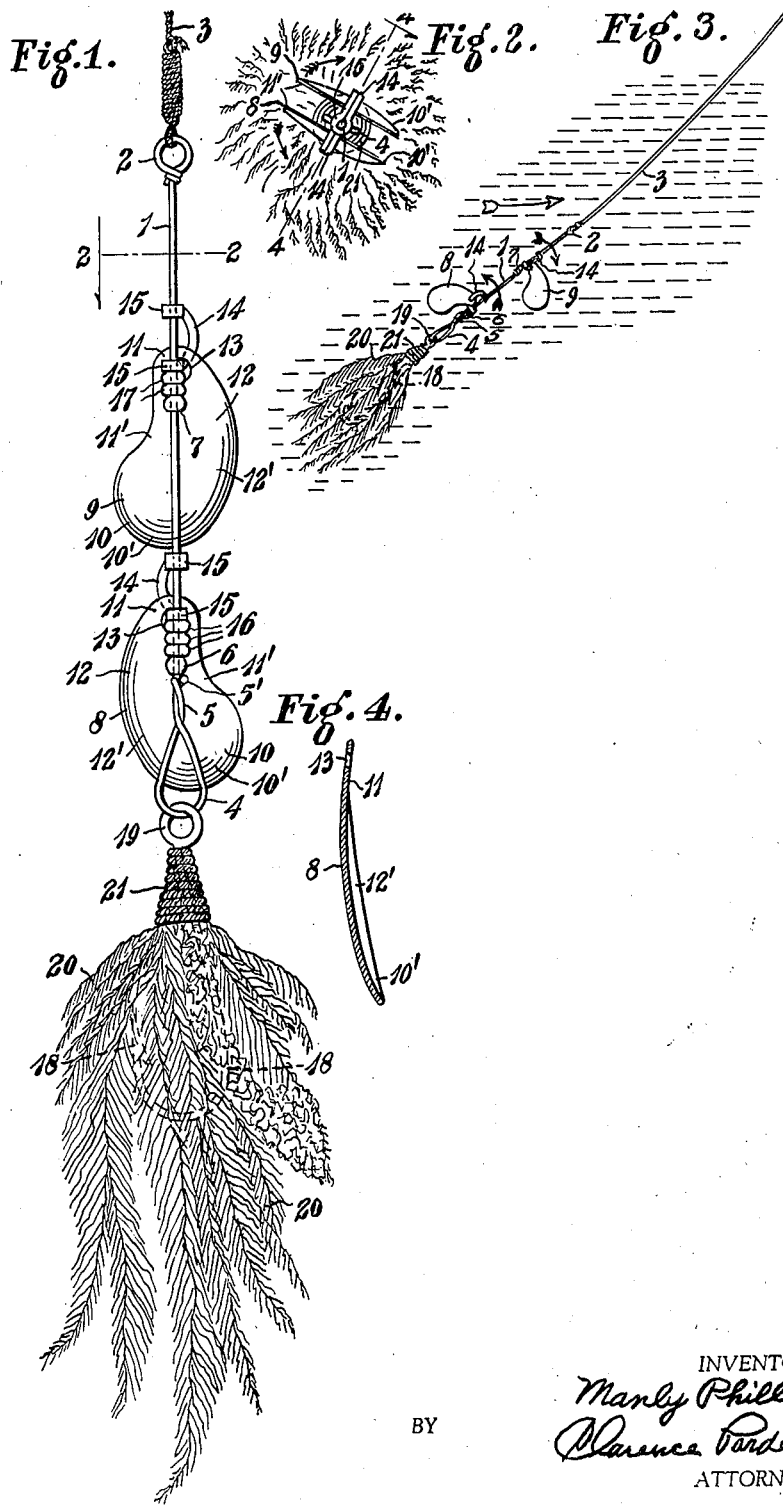
INVENTOR.
Manly Phillips
BY Clarence Pardew
ATTORNEY.

Patented Mar. 24, 1942

2,277,350

UNITED STATES PATENT OFFICE 2,277,350

FISHING LURE

Manly Phillips, Cincinnati, Ohio

Application May 15, 1940, Serial No. 335,343

3 Claims. (Cl. 43—45)

My invention relates to devices used in association with fishing lines and hooks to simulate live bait or free prey of the fish, by movements in the water incident to travel of the device through the water. Such devices are used alone or along with actual bait on the hook as usual.

An object of my invention is to simulate, in appearance and movements, live bait or prey as above mentioned, with movements simulated in a more effective way, and not active materially to twist or snarl the fishing line or to be hampered by the line, or to snarl plumage when present as part of the lure or to be hampered by such plumage. Other objects will appear in the course of the following description, illustrated by the accompanying drawing, in which—

Figure 1 is an elevation of a lure embodying my invention;

Fig. 2 is a sectional plan view of the same, the section being on the plane of the line 2—2 of Fig. 1;

Fig. 3 is a perspective view on a smaller scale, to show the action of the lure when traveling in the water;

Fig. 4 is a vertical section of one of the vanes, on the plane of the line 4—4 of Fig. 2;

The lure of Figs. 1, 2 and 3 is designed as a "fly-rod spinner"; and, for example, comprises a shank 1 of wire bent at one end to form an eye 2 in which the fishing line 3 is tied. The opposite end is bent to form the hook attaching eye 4; being adapted to be opened and closed by having the end portion of the wire bent in a high-pitch helix 5 around the standing portion, as shown, about three-fourths of a turn, ending in a sharply bent short locking portion 5' so acting on the standing portion of the wire that its resistance to unlocking increases with the lengthwise tension on the eye, but readily opening by lateral squeezing of the eye.

Adapted to rest against the end portion 5' of the eye 4, a bead 6 loosely surrounds the shank 1; and about midway of the length of the shank a second bead 7 is fixed on the shank. The vanes 8 and 9 are alike in outline, differing only in that each is dished inversely to the dishing of the other. The preferred outline of these vanes, as shown, is that of a distorted oval with a relatively large semicircular end portion 10 joined to a relatively small semicircular end portion 11 by a middle portion 12 which is bowed away from the alinement of the two end portions. In the smaller end portion 11 is an aperture 13.

To connect each vane 8 or 9 rotatively to the shank 1, a yoke clip 14 is formed of a flat ring bent on its diameter so that the two halves coincide, and with compound bends where so bent, forming eyes 15 which thus are at opposite ends of a semicircle and are small enough to pass through the aperture 13 of the vane, while large enough to loosely embrace the shank 1. This yoke clip 14 is passed through vane aperture 13 and then the clip is slipped onto the shank 1 before forming the line attaching eye 2, and, as to the lower clip, for vane 8, before the upper supporting bead 7 is formed or fastened on the shank 1. The vanes 8 and 9 thus hang on the respective clips 14; and the upper bead is up far enough to avoid the upper vane 9 striking the lower yoke clip 14.

Preferably beads 16 and 17, loosely embracing shank 1, are interposed, respectively, between lower clip 14 and lower supporting bead 6, and between upper clip 14 and upper supporting bead 7. These reduce friction between the clips and supporting beads; and also these beads 16 and 17 preferably are brightly colored to add to attractiveness of the lure.

Each vane 8 or 9 is mostly dished along the outer curved edge of its middle portion 12, at 12', and along the rim of the larger end portion 10, at 10'; the dishing being reduced toward the other areas, in smaller end portion 11 and along the shorter curved edge, at 11', which areas are approximately flat.

As the two vanes 8 and 9 are inversely dished, as before mentioned, and they are so assembled on clips 14 that, with the line end of the lure up, the vanes hang with their convex sides out away from central shank 1, the more dished areas 10' and 12' of the two vanes are inversely related. When the lure is drawn through the water, the concave inner sides of the vanes cup the water more at the more extensive and more deeply dished areas 10' and 12', and, these being inversely related, the vanes rotate around shank 1 in opposite directions, as indicated by the arrows in Figs. 2 and 3, with the longer curved edge area of each vane trailing.

I have found that the formation of vanes disclosed, with the distorted oval outline and the maximum dishing at the longer side and larger end, as just described, affords an effective rotation of the vanes with much less speed of travel of the lure through the water than is required for such effective rotation of vanes as heretofore shaped.

Moreover, the vanes rotating in opposite directions, each nullifies the effect of the other that would be had if only one vane, or a plurality of them all rotating in the same direction, were used; such effect being, if not so substantially nullified, to twist or snarl the line, and, if plumage forms part of the lure, as shown, to tangle the plumage; the line and plumage, in turn, interfering with the rotation of the vane.

The hook 18, with eye 19 detachably connected to the shank 1 as before described, is wholly or partially surrounded by the plumage 20, bound by means 21 around the shank of the hook. Such plumage of course is of suitable color or colors to add to the luring effect.

Instead of the single hook, more than one hook, or a multiple bighted and barbed hook may be employed; the arrangements of plumage may vary, or other than plumage may be used, and the body 22 may be simulative of some other live being, or may have no particularly simulative form.

Modifications may occur, and I am not limited to the rather precise disclosure herein, but claim:

1. In a fishing lure, in combination with a hook and a line and a member connecting the hook and the line loosely together, a plurality of separate dished vane elements connected to and rotatable around said member incident to their reaction to water through which the lure travels, a certain number of said vane elements equal to the number of the rest of the vane elements being so dished differently from the rest of the vane elements as to rotate in direction opposite to the direction of rotation of the rest of the vane elements, and thereby each number of vane elements acting to nullify substantially the action of the other number of vane elements which would tend, by action of one element alone or a plurality of elements all rotating in the same direction, to distort the line from normal most effective shape.

2. A fishing lure as set forth in claim 1, in which each therein mentioned vane element is of distorted oval outline, their connections being by means of their smaller ends, and the dishing of the vane elements being each inversely to the dishing of the other with respect to the distorted oval shape of each, thereby being effective for the therein described opposite simultaneous motions.

3. A fishing lure as set forth in claim 1, in which each therein mentioned vane element is of distorted oval outline, their connections being by means of their smaller ends, and the dishing of the vane elements being each inversely to the dishing of the other with respect to the distorted oval shape of each, and the dishing of each being substantially greater in areas adjacent the edges of the longer side of the distorted oval and the rim of the larger end of said oval, than in areas adjacent the smaller end and the shorter side of said distorted oval, thereby being effective for the therein described opposite simultaneous motions.

MANLY PHILLIPS.